(12) United States Patent
Copeland

(10) Patent No.: US 11,816,677 B2
(45) Date of Patent: Nov. 14, 2023

(54) CALL PREPARATION ENGINE FOR CUSTOMER RELATIONSHIP MANAGEMENT

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 373 days.

(21) Appl. No.: 17/302,405

(22) Filed: May 3, 2021

(65) Prior Publication Data

US 2022/0350963 A1  Nov. 3, 2022

(51) Int. Cl.
| | | |
|---|---|---|
| *G06Q 30/01* | (2023.01) | |
| *H04L 65/1069* | (2022.01) | |
| *H04M 7/00* | (2006.01) | |
| *H04L 65/1104* | (2022.01) | |
| *G06F 40/205* | (2020.01) | |

(52) U.S. Cl.
CPC ......... *G06Q 30/01* (2013.01); *H04L 65/1069* (2013.01); *H04L 65/1104* (2022.05); *H04M 7/006* (2013.01); *G06F 40/205* (2020.01)

(58) Field of Classification Search
None
See application file for complete search history.

(56) References Cited

U.S. PATENT DOCUMENTS

| | | |
|---|---|---|
| 6,785,380 B2 | 8/2004 | Ribera |
| 6,829,603 B1 | 12/2004 | Chai et al. |
| 7,275,083 B1 | 9/2007 | Seibel et al. |
| 7,486,785 B2 | 2/2009 | Flores |
| 8,108,237 B2 | 1/2012 | Bourne et al. |
| 8,332,279 B2 | 12/2012 | Woolston |
| 8,411,843 B1 | 4/2013 | Cyriac |
| 9,049,295 B1 | 6/2015 | Cooper |

(Continued)

FOREIGN PATENT DOCUMENTS

| | | |
|---|---|---|
| KR | 1020180058877 | 7/2018 |
| WO | WO 2016139666 | 9/2016 |
| WO | WO 2018020517 | 2/2018 |

OTHER PUBLICATIONS

Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.

(Continued)

*Primary Examiner* — Antim G Shah
(74) *Attorney, Agent, or Firm* — Fish & Richardson P.C.

(57) ABSTRACT

Call preparation engine for customer relationship management ("CRM") is presented. Example embodiments of the present invention include invoking an intelligence assistant to retrieve lead details, customer information, and insights for use during a call between a tele-agent and a customer; administering tele-agent call preparation notes for use during the call between the tele-agent and the customer; and displaying, through a call preparation cockpit, the lead details, customer information, insights and tele-agent call preparation notes.

14 Claims, 9 Drawing Sheets

(56) References Cited

U.S. PATENT DOCUMENTS

| | | |
|---|---|---|
| 9,165,556 B1 | 10/2015 | Sugar |
| 9,848,082 B1 | 12/2017 | Lilland |
| 9,860,391 B1 | 1/2018 | Wu et al. |
| 9,936,066 B1 | 4/2018 | Mammen et al. |
| 9,942,779 B1 | 4/2018 | Proctor |
| 9,948,783 B1 | 4/2018 | Farrell |
| 10,026,092 B2 | 7/2018 | Heater et al. |
| 10,057,423 B1 | 8/2018 | Sheikh |
| 10,101,976 B2 | 10/2018 | Cavalcante |
| 10,303,466 B1 | 5/2019 | Karman |
| 10,482,384 B1 | 11/2019 | Stoilos |
| 2003/0069780 A1 | 4/2003 | Hailwood et al. |
| 2003/0126136 A1 | 7/2003 | Omoigui |
| 2004/0143473 A1 | 7/2004 | Tivey et al. |
| 2004/0210881 A1 | 10/2004 | Friedman |
| 2005/0005266 A1 | 1/2005 | Datig |
| 2005/0044357 A1 | 2/2005 | Fano |
| 2005/0105712 A1 | 5/2005 | Williams et al. |
| 2006/0095273 A1 | 5/2006 | Montvay et al. |
| 2006/0098625 A1 | 5/2006 | King |
| 2006/0239439 A1 | 10/2006 | Blackwood |
| 2007/0019618 A1 | 1/2007 | Shaffer |
| 2007/0064913 A1 | 3/2007 | Shaffer |
| 2007/0094183 A1 | 4/2007 | Paek et al. |
| 2007/0233561 A1 | 10/2007 | Golec |
| 2007/0233730 A1 | 10/2007 | Johnston |
| 2008/0162498 A1 | 7/2008 | Omoigui |
| 2008/0275744 A1 | 11/2008 | MacIntyre et al. |
| 2009/0070322 A1 | 3/2009 | Salvetti |
| 2009/0132474 A1 | 5/2009 | Ma |
| 2009/0245500 A1 | 10/2009 | Wampler |
| 2009/0271192 A1 | 10/2009 | Marquette |
| 2010/0010802 A1 | 1/2010 | Ruano |
| 2010/0036788 A1 | 2/2010 | Wu |
| 2010/0063799 A1 | 3/2010 | Jamieson |
| 2010/0114563 A1 | 5/2010 | Choi |
| 2011/0077999 A1 | 3/2011 | Becker et al. |
| 2011/0082829 A1 | 4/2011 | Kolovski |
| 2011/0113094 A1 | 5/2011 | Chunilal |
| 2011/0206198 A1 | 8/2011 | Freedman |
| 2011/0264451 A1 | 10/2011 | Hoepfinger |
| 2012/0059776 A1 | 3/2012 | Estes |
| 2012/0078636 A1 | 3/2012 | Ferrucci |
| 2012/0233558 A1 | 9/2012 | Naim |
| 2012/0275642 A1 | 11/2012 | Aller |
| 2012/0303355 A1 | 11/2012 | Liu et al. |
| 2013/0091090 A1 | 4/2013 | Spivack et al. |
| 2013/0006916 A1 | 6/2013 | McBride |
| 2013/0163731 A1 | 6/2013 | Yan |
| 2013/0204663 A1 | 8/2013 | Kahlow |
| 2014/0022328 A1 | 1/2014 | Gechter et al. |
| 2014/0081585 A1 | 3/2014 | Cappucino et al. |
| 2014/0081934 A1 | 3/2014 | Mizell |
| 2014/0122535 A1 | 5/2014 | Gerard |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0270108 A1 | 9/2014 | Riahi et al. |
| 2014/0278343 A1 | 9/2014 | Tran |
| 2014/0314225 A1 | 10/2014 | Riahi |
| 2014/0372630 A1 | 12/2014 | Bostick |
| 2014/0379755 A1 | 12/2014 | Kuriakose |
| 2015/0012350 A1 | 1/2015 | Li et al. |
| 2015/0066479 A1 | 3/2015 | Pasupalak |
| 2015/0112756 A1 | 4/2015 | Subramanian et al. |
| 2015/0170163 A1 | 6/2015 | Wagner et al. |
| 2015/0189085 A1 | 7/2015 | Riahi et al. |
| 2015/0201077 A1 | 7/2015 | Konig et al. |
| 2015/0242410 A1 | 8/2015 | Pattabhiraman et al. |
| 2015/0254234 A1 | 9/2015 | Dixit et al. |
| 2015/0261743 A1 | 9/2015 | Sengupta |
| 2015/0294405 A1 | 10/2015 | Hanson |
| 2015/0309994 A1 | 10/2015 | Liu |
| 2015/0348551 A1 | 12/2015 | Gruber |
| 2015/0379603 A1 | 12/2015 | Gupta |
| 2016/0019882 A1 | 1/2016 | Matula |
| 2016/0021181 A1 | 1/2016 | Ianakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0117593 A1 | 4/2016 | London |
| 2016/0125364 A1 | 5/2016 | Field et al. |
| 2016/0162913 A1 | 6/2016 | Linden et al. |
| 2016/0171099 A1 | 6/2016 | Lorge et al. |
| 2016/0171511 A1 | 6/2016 | Goel et al. |
| 2016/0188686 A1 | 6/2016 | Hopkins |
| 2016/0189028 A1 | 6/2016 | Hu et al. |
| 2016/0217479 A1 | 7/2016 | Kashyap et al. |
| 2016/0232540 A1 | 8/2016 | Gao et al. |
| 2016/0239851 A1 | 8/2016 | Tanner |
| 2016/0162474 A1 | 9/2016 | Agarwal |
| 2016/0321748 A1 | 11/2016 | Mahatm |
| 2016/0335544 A1 | 11/2016 | Bretschneider et al. |
| 2017/0006135 A1 | 1/2017 | Siebel et al. |
| 2017/0017694 A1 | 1/2017 | Roytman et al. |
| 2017/0024375 A1 | 1/2017 | Hakkani-Tur |
| 2017/0091390 A1 | 3/2017 | Joul |
| 2017/0124193 A1 | 5/2017 | Li |
| 2017/0147635 A1 | 5/2017 | McAteer et al. |
| 2017/0154108 A1 | 6/2017 | Li et al. |
| 2017/0177715 A1 | 6/2017 | Chang |
| 2017/0200220 A1 | 7/2017 | Nicholson |
| 2017/0195488 A1 | 8/2017 | Pendyaia |
| 2017/0262429 A1 | 9/2017 | Harper |
| 2017/0262530 A1 | 9/2017 | Okura |
| 2017/0293610 A1 | 10/2017 | Tran |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0188617 A1* | 6/2019 | Copeland .......... G06F 16/90335 |
| 2019/0206400 A1 | 7/2019 | Cui |
| 2019/0220794 A1 | 7/2019 | Kulkarni |
| 2019/0340294 A1 | 11/2019 | Spangler |
| 2019/0370669 A1 | 12/2019 | Pais et al. |
| 2020/0042642 A1 | 2/2020 | Bakis |
| 2020/0097814 A1 | 3/2020 | Devesa |
| 2020/0110835 A1 | 4/2020 | Zhao |
| 2020/0160458 A1 | 5/2020 | Bodin et al. |
| 2020/0184556 A1 | 6/2020 | Cella |
| 2020/0372016 A1 | 11/2020 | Rogynskyy et al. |
| 2021/0004536 A1* | 1/2021 | Adibi .................. G10L 15/1822 |
| 2021/0406964 A1 | 12/2021 | Copeland |

OTHER PUBLICATIONS

Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

Wee, T., Perdana, A., & Remy, D. (2019). Data analytics dilemma at alpen hotel. Journal of Information Technology Teaching Cases, 9(2), 58-63. doi:http://dx.doi.org/10.1177/2043886919870543 (Year: 2019).

* cited by examiner

CALL PREPARATION ENGINE FOR CUSTOMER RELATIONSHIP MANAGEMENT

ADDITIONAL APPLICATIONS

The following U.S. patent applications, having subject matter somewhat relevant to this application, are hereby for all purposes incorporated by reference into this application as though fully set forth herein:

U.S. patent application Ser. No. 15/700,210; filed Sep. 11, 2017, entitled Dynamic Scripts for Tele-Agents;

U.S. patent application Ser. No. 15/844,512; filed Dec. 15, 2017, entitled Dynamic Lead Generation;

U.S. patent application Ser. No. 16/157,075; filed Oct. 10, 2018, entitled Semantic Jargon;

U.S. patent application Ser. No. 16/154,718 filed Oct. 9, 2018, entitled Semantic Call Notes;

U.S. patent application Ser. No. 16/177,423 filed Oct. 31, 2018, entitled Semantic Inferencing in Customer Relationship Management;

U.S. patent application Ser. No. 16/183,725, filed Nov. 7, 2018, entitled Semantic CRM Mobile Communications Sessions;

U.S. patent application Ser. No. 16/183,736, filed Nov. 8, 2018, entitled Semantic Artificial Intelligence Agent;

U.S. patent application Ser. No. 16/198,742 filed Nov. 21, 2018, entitled Semantic CRM Transcripts from Mobile Communications Sessions U.S. patent application Ser. No. 16/947,802 filed Aug. 17, 2020, entitled Asynchronous Multi-Dimensional Platform For Customer And Tele-Agent Communications;

U.S. patent application Ser. No. 16/776,4882 filed Jan. 29, 2020, entitled Agnostic Augmentation of a Customer Relationship Management Application;

U.S. patent application Ser. No. 16/857,295 filed Apr. 24, 2020, entitled Agnostic Customer Relationship Management with Agent Hub and Browser Overlay;

U.S. patent application Ser. No. 16/857,321 filed Apr. 24, 2020, entitled Agnostic CRM Augmentation with a Display Screen U.S. patent application Ser. No. 16/857,341 filed Apr. 24, 2020, entitled Agnostic Customer Relationship Management with Browser Overlay and Campaign Management Portal U.S. patent application Ser. No. 17/248,314 filed Apr. 24, 2020, entitled Product Presentation for Customer Relationship Management

BACKGROUND

Customer Relationship Management (CRM') is an approach to managing a company's interaction with current and potential customers. CRM often implements data analysis of customers' history with a company to improve business relationships with customers, specifically focusing on customer retention and sales growth. CRM systems often compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales.

In view of their sheer size, CRM systems today tend to lack the infrastructure to make full use of the information they can access. A single tele-agent, working in a contact center supporting a hundred agents, is tasked to operate across several, or even many, client CRM systems, each having different interfaces. Furthermore, conventional CRM systems often do not make use of information available to the enterprise and in turn do not present that information to a tele-agent to improve the performance and efficiency of the agent.

DETAILED DESCRIPTION OF EXAMPLE EMBODIMENTS

Figure 1:
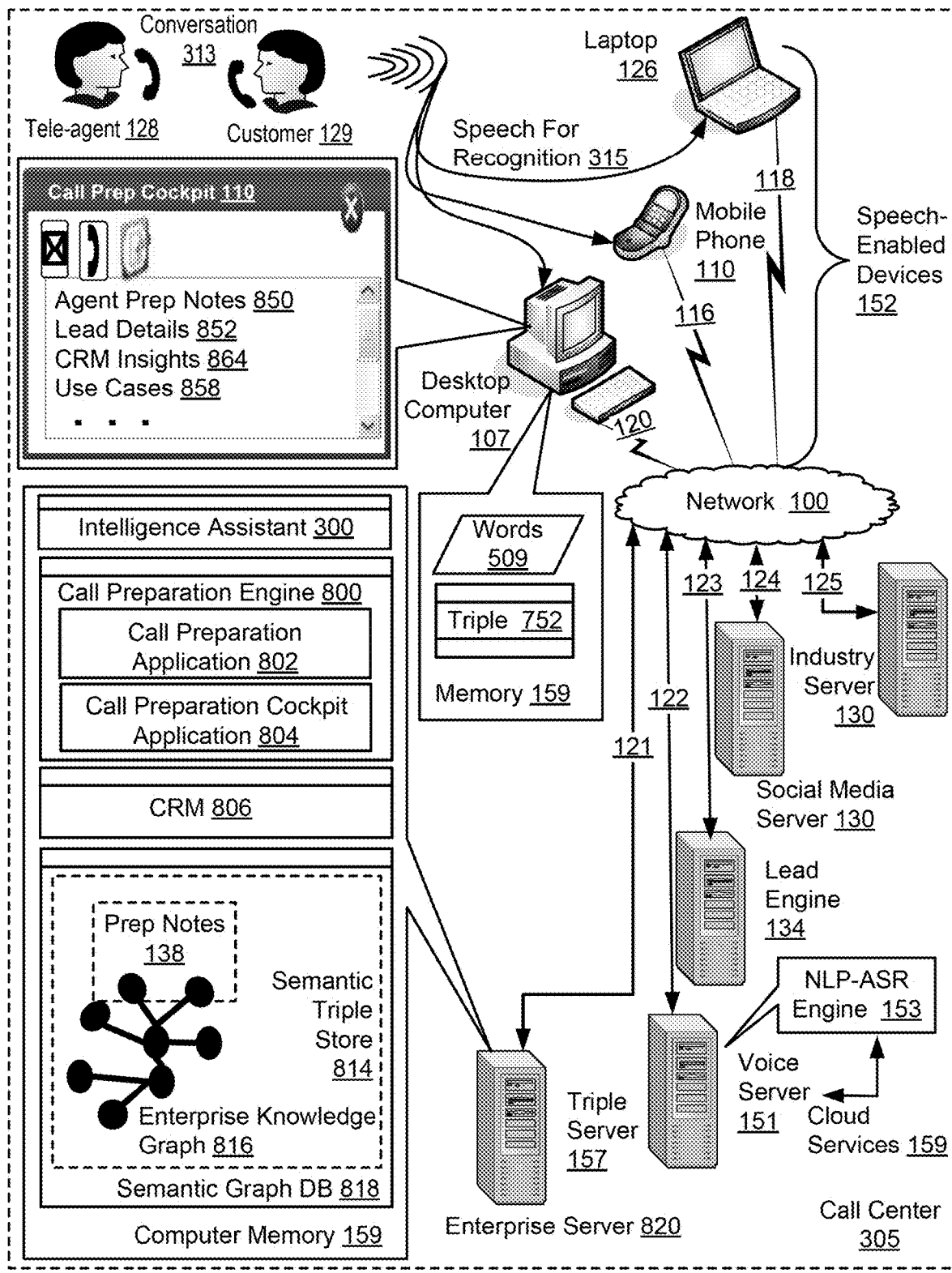
FIG. 1 sets forth a network diagram illustrating an example system for call preparation for customer relationship management (CRM') according to embodiments of the present invention.

Example methods, systems, apparatuses, and products for call preparation for customer relationship management are described with reference to the accompanying drawings, beginning with FIG. 1. FIG. 1 sets forth a network diagram illustrating an example system for call preparation for customer relationship management (CRM') according to embodiments of the present invention.

Call preparation for customer relationship management ('CRM') in the example of FIG. 1 is implemented with at least one speech-enabled device (152), a triple server (157), and a voice server (151). A speech-enabled device is automated computing machinery configured to accept and recognize speech from a user and express to a user voice prompts and speech responses. Speech-enabled devices in the example of FIG. 1 include a desktop computer (107), a smartwatch (112), a mobile phone (110), a laptop computer (126), and an enterprise server (820) operating a call preparation engine (800) according to embodiments of the present invention. Each speech-enabled device in this example is coupled for data communications through network (100) to the triple server (157) and the voice server (151). The desktop computer (107) and the enterprise server (820) operating the call preparation engine (802) are connected through wireline connections (120,121), while the smartwatch (112), mobile phone (110), and laptop (126) are connected respectively through wireless connections (114, 116, 118). Each of the connections, wired or wireline, in the example of FIG. 1 are for explanation and not for limitation. The devices, applications, and other components of FIG. 1 may be coupled for data communications in many ways as will occur to those of skill in the art.

The overall example system illustrated in FIG. 1 operates generally for call preparation according to embodiments of the present invention by invoking an intelligence assistant (300) to retrieve lead details, customer information, insights, and other information for use during a call between a tele-agent and a customer; administering tele-agent call preparation notes for use during the call between the tele-agent and the customer; and displaying the lead details, customer information, insights, and call preparation notes.

As mentioned above, call preparation according to various embodiments of the present invention is speech-enabled. Often the speech for recognition is dictated by a tele-agent in preparation of a call between the tele-agent and a customer or the speech of that conversation itself. A word (509) of digitized speech in this example is speech for recognition from a tele-agent (128) or a conversation between the tele-agent (128) and a customer. The speech for recognition can be an entire conversation, where, for example, all persons speaking are in the same room, and the entire conversation is picked up by a microphone on a speech-enabled device. The scope of speech for recognition can be reduced by providing to a speech-enabled device conversation from only to one person or a person on one side of a conversation, as only through a microphone on a headset. The scope of speech for recognition can be reduced even further by providing for recognition only speech that responds to a prompt from, for example, a VoiceXML dialogue executing on a speech-enabled device. As the scope of speech for recognition is reduced, data processing burdens are reduced across the system as a whole, although it remains an option, in some embodiments at least, to recognize entire conversations and stream across flow of all words in the conversation.

Speech from a tele-agent or from a conversation is recognized into digitized speech by operation of a natural language processing speech recognition ("NLP-SR") engine (153), shown here disposed upon a voice server (151), but also amenable to installation on speech-enabled devices. The NLP-SR engine also carries out the parsing of a word (509) of the speech so digitized (508) into a triple (752) of a description logic.

A triple is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role.

In this example description, the elements of a triple are referred to as subject, predicate, and object—and expressed like this: <subject><predicate><object>. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets, is one form of abstract syntax, optimized for human readability rather than machine processing, although its substantive content is correct for expression of triples. Using this abstract syntax, here are examples of triples:

```
<Bob> <is a> <person>
<Bob> <is a friend of> <Alice>
<Bob> <is born on> <the 4th of July 1990>
<Bob> <is interested in> <the Mona Lisa>
<the Mona Lisa> <was created by> <Leonardo da Vinci >
<the video 'La Joconde à Washington' <is about> <the Mona Lisa>
```

The same item can be referenced in multiple triples. In this example, Bob is the subject of four triples, and the Mona Lisa is the subject of one triple and the object of two. This ability to have the same item be the subject of one triple and the object of another makes it possible to effect connections among triples, and connected triples form graphs.

The example of FIG. 1 includes a semantic graph database (818) which includes an enterprise knowledge graph (816). A semantic graph is a configuration of memory that uses graph structures, nodes and edges, to represent and store data. A key concept of this kind of configuration is the graph (or edge or relationship), which directly relates data items in a data store. Such a graph database contrasts with more conventional storage such as a logical table, where links among data are mere indirect metadata, and queries search for data within the store using joins to collect related data. Semantic graphs, by design, make explicit relations among data that can be difficult to model in relational systems or logical tables.

In the example of FIG. 1, the semantic graph database (816) includes a semantic triple store (814). The semantic triple store (804) of FIG. 1 includes triple stores for access by the intelligence assistant (300), the CRM (806) and the call preparation engine (800). The triple store (814) of FIG. 1 contains structured definitions of words not special to any particular knowledge domain, where each structured definition of the general language store is implemented with a triple of description logic. The triple store (814) also includes structured definitions of words for recognition in particular knowledge domains such as products, jargon of an industry, particular industries, geographic areas, and so on, where each structured definition of the product triple store is implemented with a triple of description logic.

The semantic triple store (814) in the example of FIG. 1 includes triples defining various forms of information useful in call preparation according to embodiments of the present invention. Such triples may be queried by an intelligence assistant invoked by a call preparation engine to retrieve insights, call preparation notes parsed into semantic triples, customer connections, relevant use cases, chats, installed technology of a customer, a talk track, product recommendations, agent scoring, call goals, dynamic scripts, and so on as will occur to those of skill in the art. The information stored in knowledge graph (816) of FIG. 1 is presented for explanation and not for limitation. The enterprise knowledge graph may be used to store other information useful in call preparation according to embodiments of the present invention as will occur to those of skill in the art.

As mentioned above, the example of FIG. 1 includes a CRM (806). Such a CRM is a CRM system configured for the use of tele-agents and other users of the enterprise. Often data stored on and accessed by the CRM is data owned by the enterprise itself and collected over time for the use of various users of the organization as will occur to those of skill in the art. In other embodiments of the present invention, the CRM may be owned by a client of the call center and the data residing in that CRM is owned by the client.

The example of FIG. 1 includes a call preparation engine (800). The call preparation engine of FIG. 1 is a module of automated computing machinery stored on one or more non-transitory computer-readable mediums. The call preparation engine (800) of FIG. 1 includes a call preparation application (802) and a call preparation cockpit application (804). The call preparation application (802) comprises a module of automated computing machinery stored on one or more non-transitory computer-readable mediums (159) and configured to invoke the intelligence assistant (300) to retrieve lead details, customer information, and insights for use during a call between a tele-agent and a customer and to administer tele-agent call preparation notes for use during the call between the tele-agent and the customer.

The call preparation cockpit application (804) also comprises a module of automated computing machinery stored on one or a non-transitory computer-readable mediums (159) and configured to receive, from the call preparation application (802), lead details, insights, and call preparation notes for use during the between a tele-agent and a customer and display, through a call preparation cockpit (110), the lead details (852). the insights (864), and the call preparation notes.

The example of FIG. 1 also includes an intelligence assistant (300). The intelligence assistant of FIG. 1 is a speech-enabled platform capable of insight generation and management of the semantic graph database as discussed in more detail below with reference to FIG. 3. The intelligence assistant (300), the CRM (806) and the call preparation application (802) are connected for data communications to an enterprise server (820), a triple server (157), a voice server (151), a lead engine (134), a social media server (130), and an industry server (130).

In the example of FIG. 1, the intelligence assistant retrieves leads from a third-party operating the lead engine (134). Such leads may provide information regarding customers often including contact information, key employees, site locations and other information regarding the customer as will occur to those of skill in the art. The leads so retrieved are parsed into semantic triples and stored the semantic triple store (814) of the enterprise knowledge graph (816).

The intelligence assistant (300), CRM (806), and the call preparation application (802) of FIG. 1 are connected for data communications with one or more social media servers (130). Such social media servers are often implemented by third parties and often provide information and insight about their users. Examples of social media companies include linkedIn, Facebook, Instagram, and others as will occur to those of skill in the art. In the example of FIG. 1, the intelligence assistant (300) may receive information directly from the social media servers or indirectly from the CRM or call preparation engine and parse the information into semantic triples for storage in the semantic triple store of the enterprise knowledge graph.

The CRM (806) and call preparation application of FIG. 1 is connected for data communications with one or more industry servers. Such servers are often operated by third parties and provide current and historic information regarding a particular industry, companies in various industries and so on as will occur those of skill in the art. In the example of FIG. 1, the intelligence assistant (300) may receive information directly from the industry servers or indirectly from the CRM or call preparation engine and parse the information into semantic triples for storage in the semantic triple store of the enterprise knowledge graph.

The use of a lead server (824), social media server (826) and the industry server (828) in the example of FIG. 1 is for ease of explanation and not for limitation. In fact, call preparation according to embodiments of the present invention may make use of many third-party systems or internal systems as will occur to those of skill in the art.

The example of FIG. 1 includes a call preparation cockpit (110) for the tele-agent's use in preparation for a call with a customer and during a conversation between the tele-agent (128) and the customer (129). The call preparation cockpit (110) is a speech-enabled user interface upon and through which the call preparation engine (800) provides real-time call preparation information for display to the tele-agent (128) through the dashboard (110) for the tele-agent's use in preparing for a call with a customer and during a conversation between the tele-agent (128) and the customer.

Call preparation information may be in many different forms and come from both internal proprietary data stores of the enterprise, as well as information retrieved by the CRM and the call preparation application from third-party providers.

In the example of FIG. 1, many components useful in call preparation according to embodiments of the present invention are maintained in computer memory (159). In the example of FIG. 1, computer memory (159) includes cache, random access memory ("RAM"), disk storage, and so on, most forms of computer memory. Computer memory (159) so configured typically resides upon speech-enabled devices, or as shown here, upon one or more triple servers (157), voice servers, or enterprise servers (820)

Figure 2:
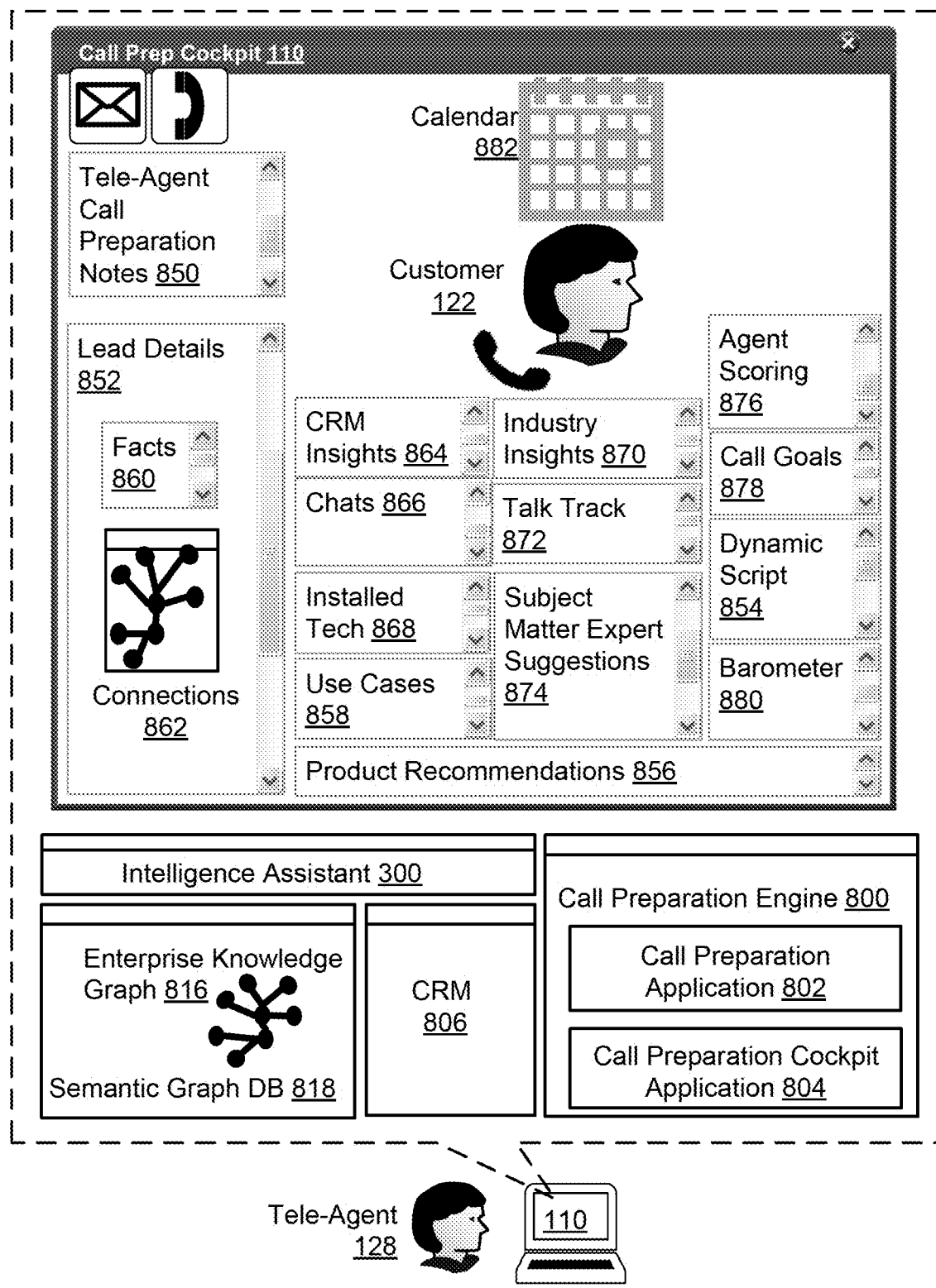
FIG. 2 sets forth a line drawing of an example system for call preparation according to embodiments of the present invention.

For further explanation, FIG. 2 sets forth a line drawing of an example system for call preparation according to embodiments of the present invention. The example of FIG. 2 includes a semantic graph database (818) which includes an enterprise knowledge graph (816). The semantic graph database (818) and enterprise knowledge graph (816) maintains a data store of proprietary and non-proprietary information regarding, among other things, customer information, products that may be discussed between a tele-agent (128) and customers, recommended products for the customer, tele-agent nots for user during the call so on as will occur to those of skill in the art. Such information may be provided to the call preparation application who in turns proves information to call preparation cockpit application (804) and the call preparation cockpit application (804) displays onto the call preparation cockpit (110) making the information available of use by the tele-agent (128) in real-time both before and during a conversation between the tele-agent and the customer.

The example of FIG. 2 also includes a CRM (806) having a data store of proprietary and non-proprietary information regarding, among other things, customer information, products that may be discussed between a tele-agent (128) and customers, recommended products for the customer, tele-agent nots for user during the call so on as will occur to those of skill in the art. Such information may be provided to the call preparation application who in turns proves information to call preparation cockpit application (804) and the call preparation cockpit application (804) displays onto the call preparation cockpit (110) making the information available of use by the tele-agent (128) in real-time both before and during a conversation between the tele-agent and the customer.

The example of FIG. 2 includes an intelligence assistant (300), a targeted collection of artificial intelligence-based technologies including natural and semantic language processing that processes unstructured communications into structured information that generates, in dependence upon the structured information and CRM data, insights available to the call preparation engine, ultimately driving improved quality and efficiency of the tele-agent. The intelligence assistant (300) administers an enterprise knowledge graph (816) of a semantic graph database that houses structured data in the form of triples optimized for insight generation.

The example of FIG. 2 includes a call preparation engine (800) that includes a call preparation application (802) and a call preparation cockpit application (804). The call preparation engine (900) of FIG. 2 is a module of automated computing machinery stored on one or more non-transitory computer-readable mediums. The call preparation application (802) operates generally by invoking an intelligence assistant (300) to retrieve lead details, customer information, insights, and other information for use during a call between a tele-agent and a customer; administering tele-agent call preparation notes for use during the call between the tele-agent and the customer.

The call preparation cockpit application (804) of FIG. 2 comprises a module of automated computing machinery stored on one or a non-transitory computer-readable mediums (159) and operates generally by receiving and displaying lead details, customer information, insights, call preparation notes and other information as discussed herein.

In the example of FIG. 2, the tele-agent is provided real-time customer and product information displayed through the call preparation cockpit (110) for real-time use by the tele-agent in both preparation for a call with a customer and for use during the conversation with the customer. In the example of FIG. 2, the speech-enabled dashboard includes a widget for the display of the tele-agent's call preparation notes (850). Such call notes may be prepared or supplemented by the tele-agent before, during, or after a conversation with the customer.

Widgets in this disclosure are implemented as software applications or components that perform one or more particular tasks and whose execution is administered by the call preparation engine, often through the call preparation application or the call preparation cockpit. The widgets of FIG. 2 are described as being administered by the call preparation cockpit (110), but this is for ease of explanation and not for limitation. Each of the widgets described in this disclosure have an accompanying GUI element as illustrated in FIG. 2. The example widgets and their associated GUI elements are for explanation and not for limitation. In fact, call preparation engines according to embodiments of the present invention may administer widgets that have no GUI elements or have more than one GUI element as will occur to those of skill in the art.

In the example of FIG. 2, the speech-enabled call preparation cockpit (110) includes a widget for the display of the lead details (852) including information describing the customer and customer's business often including name and contact information of the customer, the industry supported by the customer, the locations the customer conducts business, and other useful information that may be included in a listing of facts (860) about the customer. The cockpit (110) of FIG. 2 also displays a connections image (862) that provides to the tele-agent (128) any known connections between the customer and other customers or people or organizations traced within the CRM (806).

In the example of FIG. 2, the speech-enabled call preparation cockpit (110) includes a widget for the display of a calendar (882) and widget for CRM insights (864) displaying insights regarding the customer known or derived by the CRM (806). In the example of FIG. 2, the speech-enabled dashboard (110) includes a widget for the display of the technology (858) currently installed in the customer's sites and locations useful in discussing products that are compatible with that installed technology with the customer.

In the example of FIG. 2, the speech-enabled call preparation cockpit (110) includes a widget for the display of use cases (880) describing the product that may be useful to the tele-agent during a conversation with the customer. Often such use cases are provided by clients of the call center to better inform customers about the products the client sells. Similarly, such clients may provide other collateral that may be useful in communicating with the customer and such collateral may come in many forms as will occur to those of skill in the art.

In the example of FIG. 2, the speech-enabled cockpit (110) includes a widget for the display of product recommendations (852) for the customer and a display of competing products (868) that may be sold by competitors of the tele-agent that are compatible with the currently installed technology already in use by the customer. These product recommendations may be useful to a tele-agent (128) in preparation for or during a conversation with the customer. Such product recommendations may be provided by the semantic graph database (816), the CRM (806), the call preparation engine (800) or from other sources as will occur to those of skill in the art.

In the example of FIG. 2, the speech-enabled call preparation cockpit (110) includes a widget for the display of industry insights. Industry insights may include current trends in the customer's industry, newly available products for use in an industry, current news regarding the industry and so on as will occur to those of skill in the art. Such insights may be stored and managed by the semantic graph database (816), the CRM (806), the call preparation engine (800), or provided from third parties such as third parties operating industry servers, social media servers, lead servers and many others as will occur to those of skill in the art.

In the example of FIG. 2, the speech-enabled call preparation cockpit (110) includes a widget for the display of a talk track. The talk track includes a campaign specific introduction for a phone call with the customer and optionally additional talking points for the tele-agent. In some cases, a tele-agent may want to customize a talk track to include preferred vernacular, style, and other attributes. The talk track is editable in the example of FIG. 2 by the tele-agent through speech or by use of a keyboard.

In the example of FIG. 2, the speech-enabled call preparation cockpit (110) includes a widget for the display of subject matter expert suggestions (874). Subject matter expert suggestions (874) may be provided in real time or maintained by the semantic graph database (816), the CRM (806), the call preparation engine (800) of received from other sources as will occur to those of skill in the art. Subject matter expert suggestions may be provided by internal subject matter experts or by third-party subject matter experts or in other ways as will occur to those of skill in the art.

In the example of FIG. 2, the speech-enabled call preparation cockpit (110) includes a widget for agent scoring (876). An agent score may represent the tele-agents place along a defined sales cycle of a campaign, the tele-agents rank among other agents in the call center or enterprise, as well as other ways of scoring the tele-agent as will occur to those of skill in the art. Such an agent score may be developed and maintained by the semantic graph database (816), the CRM (806), the call preparation engine (800), or other components as will occur to those of skill in the art.

In the example of FIG. 2, the speech-enabled call preparation cockpit (110) includes a widget for the display of call goals (878) for the tele-agent. Such call goals are typically provided by the CRM (806) or the call preparation application (802) and are often related to the tele-agents place in a sales cycle defined for the particular campaign.

In the example of FIG. 2, the speech-enabled call preparation cockpit (110) includes a widget for the display of a dynamic script (854) often created in real-time as a guidance and aid for the tele-agent in the conversation with the customer. Such a script may be created by the CRM (806), the call preparation engine (800) or other components based upon the current sales campaign, information relating to the customer, historic sales trends, success stories of tele-agents and may other factors as will occur to those of skill in the art.

In the example of FIG. 2, the speech-enabled dashboard (110) includes a widget for the display of a barometer (860) the barometer is graphic representation or text display providing the tele-agent with an indication of the current performance of the tele-agent servicing a particular sales campaign. Such a barometer may be created by the semantic graph database (816), CRM (806), call preparation engine (800) or other components based on many factors such as the goals of the sales campaign, the performance of the tele-agent or other the tele-agents servicing the sales campaign and many other factors as will occur to those of skill in the art.

The components and widgets presented in the example of FIG. 2 are for explanation and not for limitation. Components and widgets, as well as the functions they perform and information they provide may vary dramatically among various embodiments of the present invention as will occur to those of skill in the art. All such components and widgets whatever their form may be used for call preparation for CRM according to various embodiments of the present invention.

Figure 3:
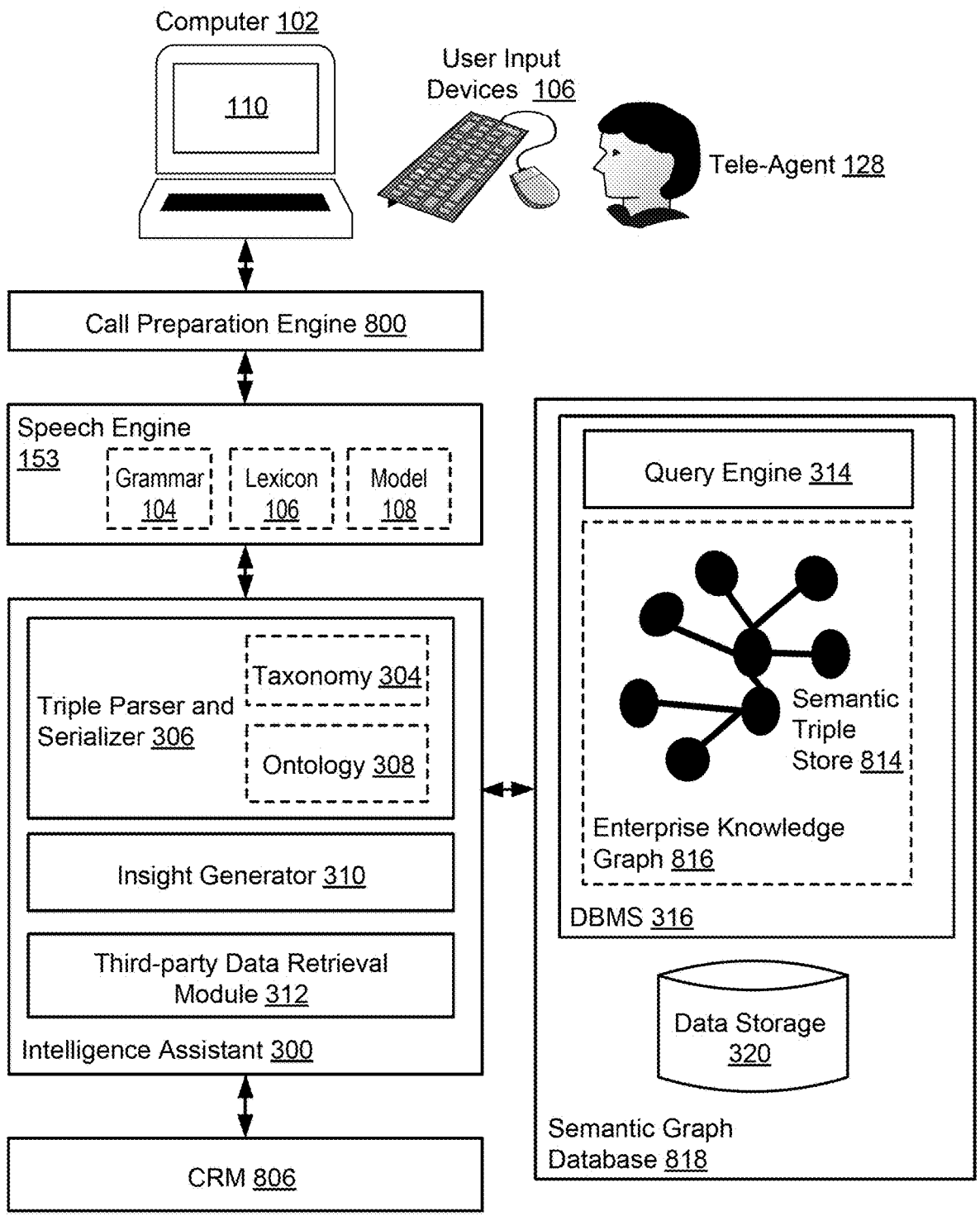
FIG. 3 sets forth a system diagram of a system for call preparation according to embodiments of the present invention.

For further explanation, FIG. 3 sets forth a system diagram illustrating a system for call preparation according to embodiments of the present invention. The system of FIG. 3 includes a call preparation engine (800), a computer (102), a CRM (806), a speech engine (153), an intelligence assistant (300), and a semantic graph database (818) networked for data communications. The call preparation engine (800) is a module of automated computing machinery configured to invoke an intelligence assistant (300) to retrieve lead details, customer information, and insights for use during a call between a tele-agent and a customer, administer tele-agent call preparation notes for use during the call between the tele-agent and the customer, and display, through a call preparation cockpit, the lead details, customer information, insights and tele-agent call preparation notes.

The intelligence assistant (300) of FIG. 3 is a targeted collection of artificial intelligence-based technologies including natural and semantic language processing that processes unstructured communications into structured information and generates in dependence upon the structured information and CRM data insights available to the call preparation engine, ultimately driving improved quality and efficiency of the tele-agent.

The CRM (806) of FIG. 3 is automated computing machinery that provides contact management, sales management, agent productivity administration, and other services targeted to improved customer relations and ultimately customer satisfaction and enterprise profitability. The example CRM of FIG. 3 manages manage customer relationships across the entire customer lifecycle, individual sales cycles, campaigns, driving marketing, sales, and customer service and so on.

The semantic graph database (818) of FIG. 3 is a type of graph database that is capable of integrating heterogeneous data from many sources and making links between datasets. It focuses on the relationships between entities and is able to infer new knowledge out of existing information. There semantic graph database of FIG. 3 is used to infer or understand the meaning of information. The semantic technology of FIG. 3 can link new information automatically, without manual user intervention or the database being explicitly pre-structured. This automatic linking is powerful when fusing data from inside and outside company databases, such as corporate email, documents, spreadsheets, customer support logs, relational databases, government/public/industry repositories, news feeds, customer data, social networks and much more. In traditional relational databases this linking involves complex coding, data warehouses and heavy pre-processing with exact a priori knowledge of the types of queries to be asked.

The semantic graph database (818) of FIG. 3 includes a database management system 'DBMS' (316) and data storage (320). The DBMS of FIG. 3 includes an enterprise knowledge graph (816) and a query engine (314). The enterprise knowledge graph of FIG. 3 is a structured representation of data stored in data storage (320). The query engine of FIG. 3 receives structured queries and retrieves stored information in response.

The system of FIG. 3 includes a speech engine (153). The example speech engine includes an NLP engine and ASR engine for speech recognition and text-to-speech ('TTS') for generating speech. The example speech engine (153) includes a grammar (104), a lexicon (106), and a language-specific acoustic model (108) as discussed in more detail below.

The intelligence assistant (300) of FIG. 3 includes a triple parser and serializer (306). The triple parser of FIG. 3 takes as input a file in some format such as the standard RDF/XML format, which is compatible with the more widespread XML standard. The triple parser takes such a file as input and converts it into an internal representation of the triples that are expressed in that file. At this point, the triples are stored in the triple store are available for all the operations of that store. Triples parsed and stored in the triple store can be serialized back out using the triple serializer (306).

The triple parser of Figure creates triples in dependence upon a taxonomy (304) and an ontology (308). The taxonomy (304) includes words or sets of words with defined semantics that will be stored as triples. To parse speech into semantic triples the triple parser receives text converted from speech by the speech engine and identifies portions of that text that correspond with the taxonomy and forms triples using the defined elements of the taxonomy.

The triple parser of FIG. 3 also creates triples in dependence upon an ontology (308). An ontology is a formal specification that provides sharable and reusable knowledge representation. An ontology specification includes descriptions of concepts and properties in a domain, relationships between concepts, constraints on how the relationships can be used and other concepts and properties.

The intelligence assistant (300) of FIG. 3 includes an insight generator (310). The insight generator (310) of FIG. 3 queries the query engine (314) of the semantic graph database (818) and identifies insights in dependence upon the results of the queries. Such insights may be selected from predefined insights meeting certain criteria of the search results or may be formed from the query results themselves. Such insights may be useful to a tele-agent during a conversation with a customer. Examples of insights useful in call preparation include information about an industry, a customer job title, insights relating to budget, authority, need, and time ('BANT'), cost and pricing information, competitive products, positive or negative sentiment in call, chat, email or other communication, identification of key individuals, targets reached, contacts reached, industry terms, next best action for a tele-agent, product recommendations, custom metrics, and many others as will occur to those of skill in the art. Insight generators according to embodiments of the present invention generate queries using a query language. Query languages may be implemented as an RDF query language such as SPARQL.

The intelligence assistant (300) of FIG. 3 includes a third-party data retrieval module (312). The third-party data retrieval module (312) of FIG. 3 is a module of automated computing machinery configured to retrieve information from third-party resources such as industry servers, social media servers, clients, customers, and other resources as will occur to those of skill in the art.

Figure 4:
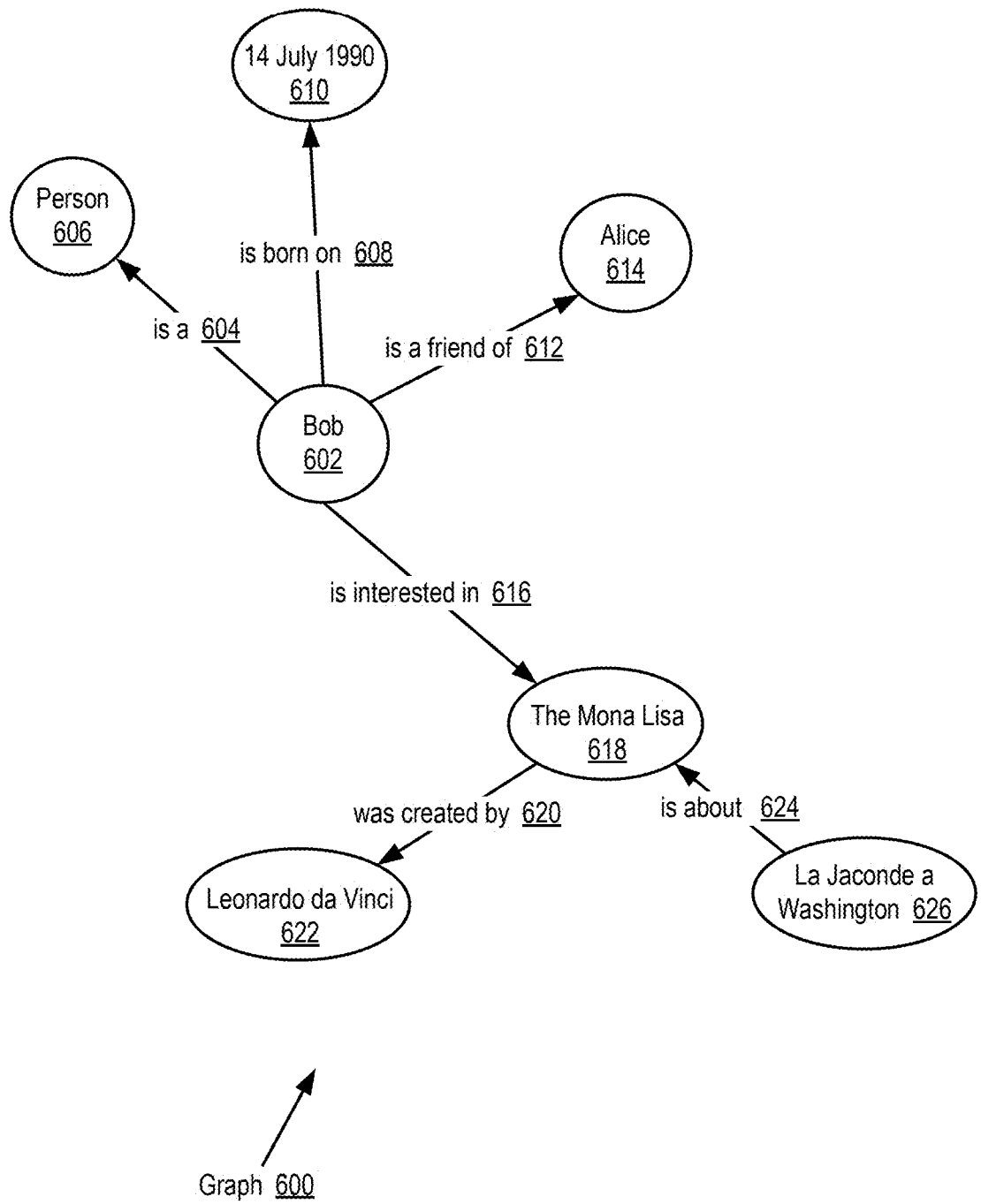
FIG. 4 sets forth a line drawing of a graph.

For further explanation of relations among triples and graphs, FIG. 4 sets forth a line drawing of a graph (600). The example graph of FIG. 4 implements in graph form the example triples set forth above regarding Bob and the Mona Lisa. In the example of FIG. 4, the graph edges (604, 608, 612, 616, 620, 624) represent respectively relations among the node, that is, represent the predicates <is a>, <is a friend of>, <is born on>, <is interested in>, <was created by>, and <is about>. The nodes themselves represent the subjects and objects of the triples, <Bob>, <person>, <Alice>, <the 4th of July 1990>, <the Mona Lisa>, <Leonardo da Vinci>, and <the video 'La Joconde à Washington'>.

In systems of knowledge representation, knowledge represented in graphs of triples, including, for example, knowledge representations implemented in Prolog databases, Lisp data structures, or in RDF-oriented ontologies in RDFS, OWL, and other ontology languages. Search and inference are effected against such graphs by search engines configured to execute semantic queries in, for example, Prolog or SPARQL. Prolog is a general-purpose logic programming language. SPARQL is a recursive acronym for "SPARQL Protocol and RDF Query Language." Prolog supports queries against connected triples expressed as statements and rules in a Prolog database. SPARQL supports queries against ontologies expressed in RDFS or OWL or other RDF-oriented ontologies. Regarding Prolog, SPARQL, RDF, and so on, these are examples of technologies explanatory of example embodiments of the present invention. Thus, such are not limitations of the present invention. Knowledge representations useful according to embodiments of the present invention can take many forms as may occur to those of skill in the art, now or in the future, and all such are now and will continue to be well within the scope of the present invention.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns HTML, documents discussing the literary concept of derivative works as well as calculus procedures. A traditional web search against the keyword "differential" returns HTML pages describing automobile parts and calculus functions.

Other queries are disposed along mid-points of the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google because it can find good answers a lot of the time, even if it cannot find perfect answers all the time. In such rough-and-tumble search environments, provable correctness is not a key goal.

Other classes of queries are disposed where correctness of results is key, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 5:
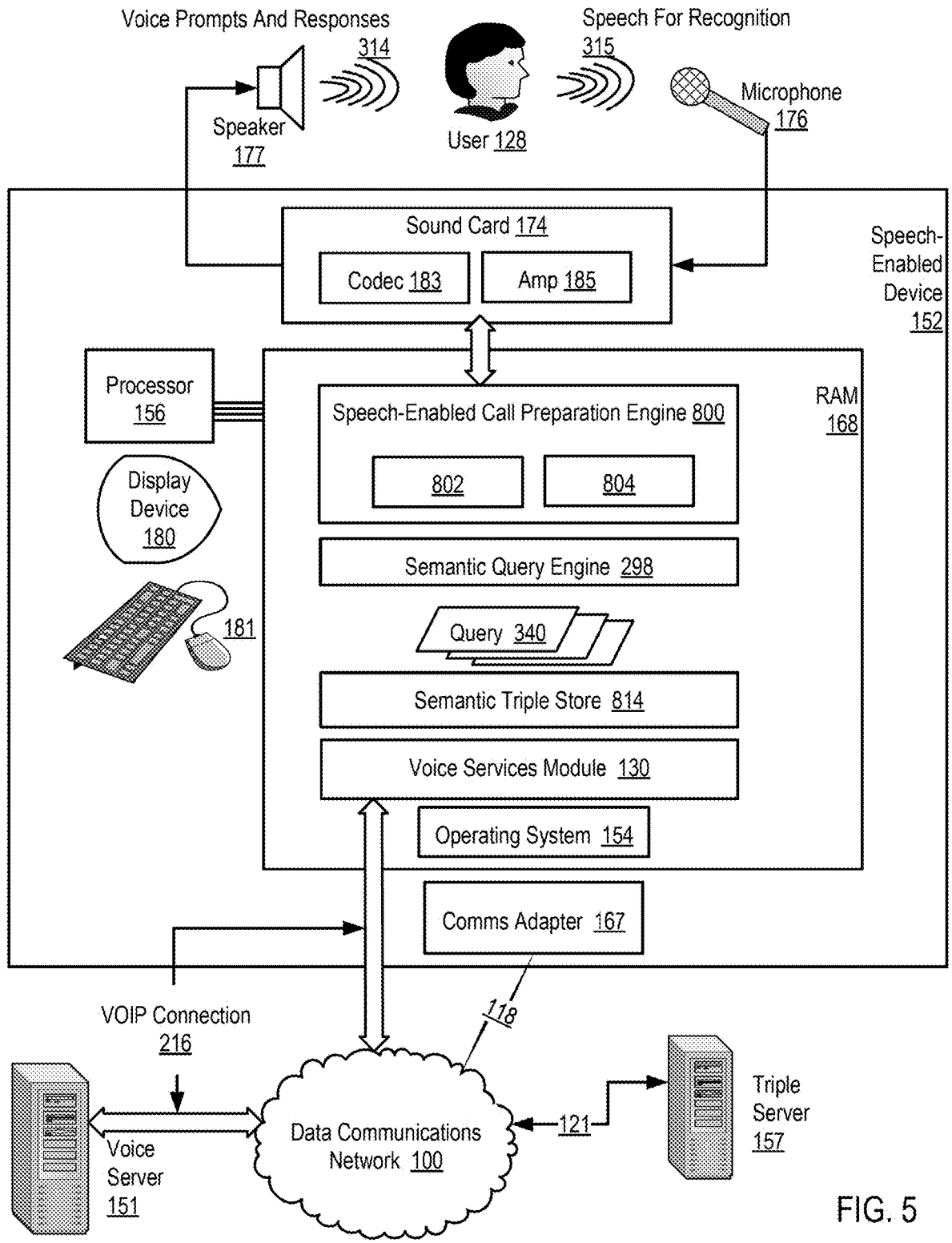
FIG. 5 sets forth a functional block diagram of an example apparatus for call preparation in a thin-client architecture according to embodiments of the present invention.

For further explanation, FIG. 5 sets forth a functional block diagram of example apparatus for call preparation in a thin-client architecture according to embodiments of the present invention. A thin-client architecture is a client-server architecture in which at least some of, perhaps most of, perhaps all of, speech processing and triple processing is off-loaded from the client to servers. Thinness of a thin client varies. The speech-enabled device in the example of FIG. 5 is a thin client in which most speech processing is off-loaded to a voice server (151). The speech-enabled device (152) accepts voice input (315, 176), but then transfers the voice input through a VOIP connection (216) to the voice server (151) where all speech processing is performed. The speech-enabled device in this example does implement some capacity for triple processing (323, 325) and query execution (298), but none of that would be absolutely necessary in a thin client. Devices with reduced storage capacity, a smartwatch or a mobile phone for example, can be implemented with no semantic query engine (298) and no triple store (323, 325), merely passing queries through to a triple server (157) that itself carries out all triple storage and all query processing.

In the particular example of FIG. 5, the speech-enabled device occupies the middle ground of thin-client architecture. It supports little speech processing, but it does support some triple processing. The speech-enabled device in this example performs triple processing and query execution only against triple stores in RAM (168), leaving large-scale storage to the triple server (157). The semantic query engine loads the triple stores as needed to respond to queries. Thus, there are query misses. When the semantic query engine cannot satisfy a query with the triple stores in RAM, it does not conclude failure. Instead, it passes the query to the triple server, and, if the triple server can satisfy the query by use of triples on the server, it passes back to the speech-enabled device both the query results and the triples that satisfied the query, which triples are then stored in RAM on the speech-enabled device for use against similar queries in the future. Over time, such an architecture builds on the speech-enabled device query stores containing frequently useful triples and reduced the need for costly query trips across the network to the triple server—while at the same time functioning with a relatively thin layer of computing resources on the client side. This is a compromise between the extremely thin client with no triple storage at all and the thick client described below with regard to FIG. 8.

The example apparatus of FIG. 5 includes a speech-enabled device (152) and a voice server (151) connected for data communication by a VOIP connection (216) through a data communications network (100). A speech-enabled application (195) runs on the speech-enabled device (152). The speech-enabled application (195) may be implemented as a set or sequence of X+V or SALT documents that execute on a speech-enabled browser, a Java Voice application that executes on a Java Virtual Machine, or a speech-enabled application implemented in other technologies as may occur to those of skill in the art. The example speech-enabled device of FIG. 4 also includes a sound card (174), which is an example of an I/O adapter specially designed for accepting analog audio signals from a microphone (176) and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

A speech-enabled application is typically a user-level, speech-enabled, client-side computer program that presents a voice interface to user (128), provides audio prompts and responses (314), and accepts input speech for recognition (315). The example of FIG. 5 includes a speech-enabled call preparation engine (800) that includes a call preparation application (802) and a call preparation cockpit (804). Speech-enabled call preparation engine (800) provides a speech interface through the call preparation cockpit (804) through which a user may provide oral speech for recognition through microphone (176) and have the speech digitized through an audio amplifier (185) and a coder/decoder ('codec') (183) of a sound card (174) and provide the digitized speech for recognition to a voice server (151). Speech-enabled call preparation engine (800) packages digitized speech in recognition request messages according to a VOIP protocol and transmits the speech to voice server (151) through the VOIP connection (216) on the network (100).

Voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, or Java Speech applications.

The speech-enabled device (152) in the example of FIG. 5 includes a semantic query engine (298), a module of automated computing machinery that accepts from the speech-enabled application (195) and executes against triple stores (323, 325) semantic queries (340). The speech-enabled application (195) formulates semantic queries with user input from speech (315), GUI, keyboard, mouse (180, 181), or the like. A semantic query is a query designed and implemented against structured data. Semantic queries utilize logical operators, namespaces, pattern matching, subclassing, transitive relations, semantic rules, and contextual full text search. Semantic queries work on named graphs, linked data, or triples. In embodiments of the present invention, triples typically are linked so as to form graphs. This enables a semantic query to process actual relationships between items of information and infer answers from the network of data.

Example formulations of semantic queries are in C, C++, Java, Prolog, Lisp, and so on. The semantic web technology stack of the W3C, for example, offers SPARQL to formulate semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words described and defined in semantic triples connected in ways that conform to a description logic. In many embodiments of the present invention, semantic queries are asserted against data structured according to a description logic that implements decidability.

In the example apparatus of FIG. 5, the speech-enabled device is coupled for data communication through a communications adapter (167), wireless connection (118), data communications network (100), and wireline connection (121) to a triple server (157). The triple server (157) provides large volume backup for triple stores (323, 325). The triple server is a configuration of automated computing machinery that serializes triples and stores serialized triples in relational databases, tables, files, or the like. The triple server retrieves upon request from non-volatile storage such serialized triples, parses the serialized triples into triple stores, and provides such triple stores upon request to speech-enabled devices for use in systems that utilize the triples in configuring computer memory according to embodiments of the present invention.

Call preparation according to embodiments of the present invention, particularly in a thin-client architecture, may be implemented with one or more voice servers. A voice server is a computer, that is, automated computing machinery, that provides speech recognition and speech synthesis. For further explanation, therefore, FIG. 6 sets forth a block diagram of automated computing machinery comprising an example of a computer useful as a voice server (151) for a speech-enabled device useful in call preparation according to embodiments of the present invention. The voice server (151) of FIG. 6 includes at least one computer processor (156) or 'CPU' as well as random access memory (168) ('RAM') which is connected through a high-speed memory bus (166) and bus adapter (158) to processor (156) and to other components of the voice server.

Stored in RAM (168) is a voice server application (188), a module of computer program instructions capable of operating a voice server in a system that is configured for use in configuring memory according to some embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in speech-enabled applications such as, for example, speech-enabled browsers, X+V applications, SALT applications, or Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present invention may be implemented in other ways as may occur to those of skill in the art, and all such ways are well within the scope of the present invention.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subject, predicates, object, and so on, and then converts the recognized, processed parts of speech into semantic triples for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language often stored in a vocabulary file. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time may not be the same.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
  #JSGF V1.0;
  grammar command;
  <command> = [remind me to] call | phone | telephone <name>
  <when>;
  <name> = bob | martha | joe | pete | chris | john | harold;
  <when> = today | this afternoon | tomorrow | next week;
  ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'harold', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application (195 on FIG. 4) in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm (FIX) (193). The VoiceXML interpreter interprets VoiceXML dialogs provided to the VoiceXML interpreter by a speech-enabled application.

As mentioned above, a Form Interpretation Algorithm ('FIA') drives the interaction between the user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 5 are shown in RAM (168), but many components of such software typically are stored in non-volatile memory also, for example, on a disk drive (170).

Figure 6:
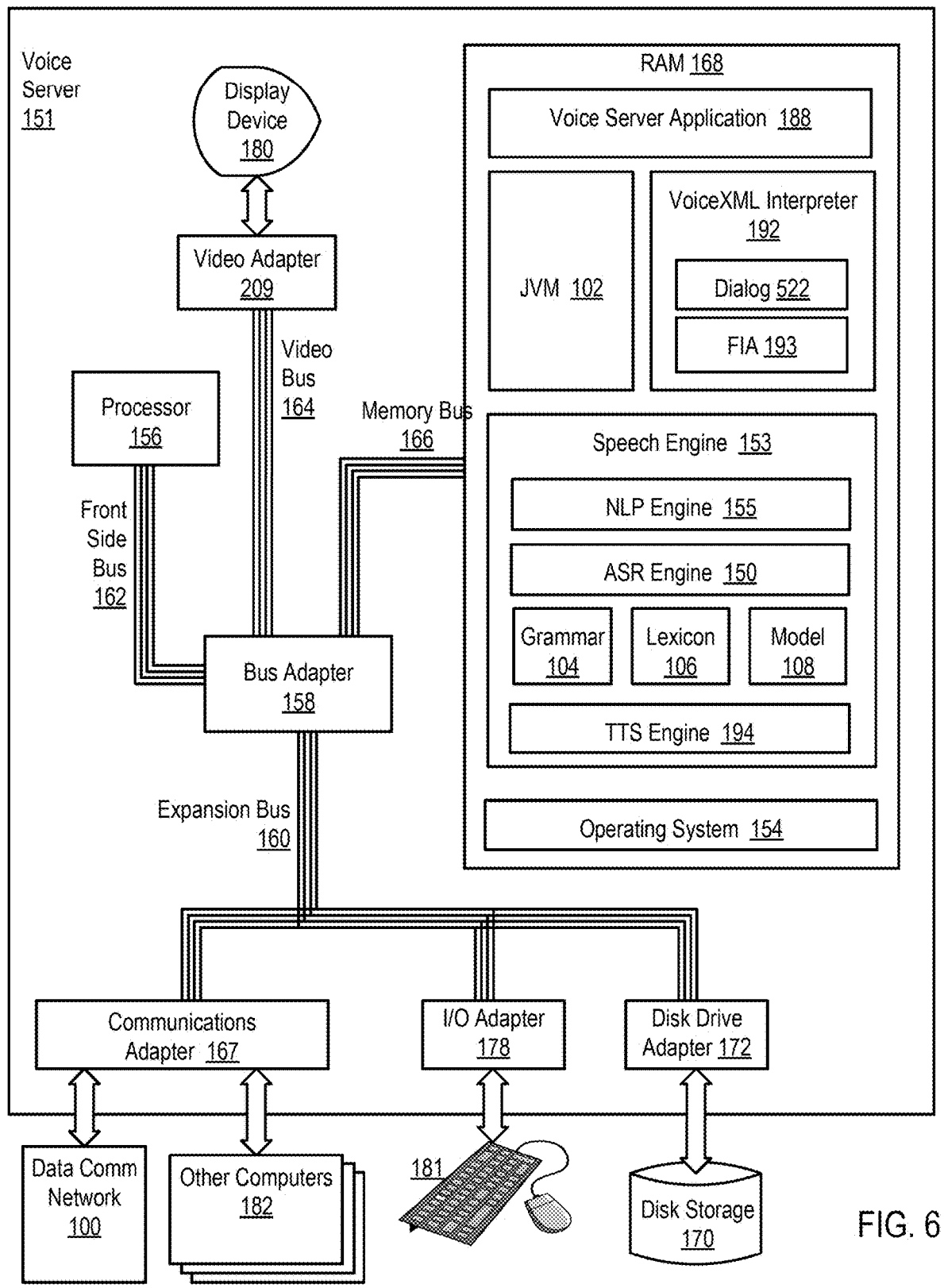
FIG. 6 sets forth a block diagram of automated computing machinery comprising an example of a computer useful as a voice server for a speech-enabled device useful in call preparation according to embodiments of the present invention.

Voice server (151) of FIG. 6 includes bus adapter (158), a computer hardware component that contains drive electronics for high-speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 6 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 6 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 5 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 6 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 7:
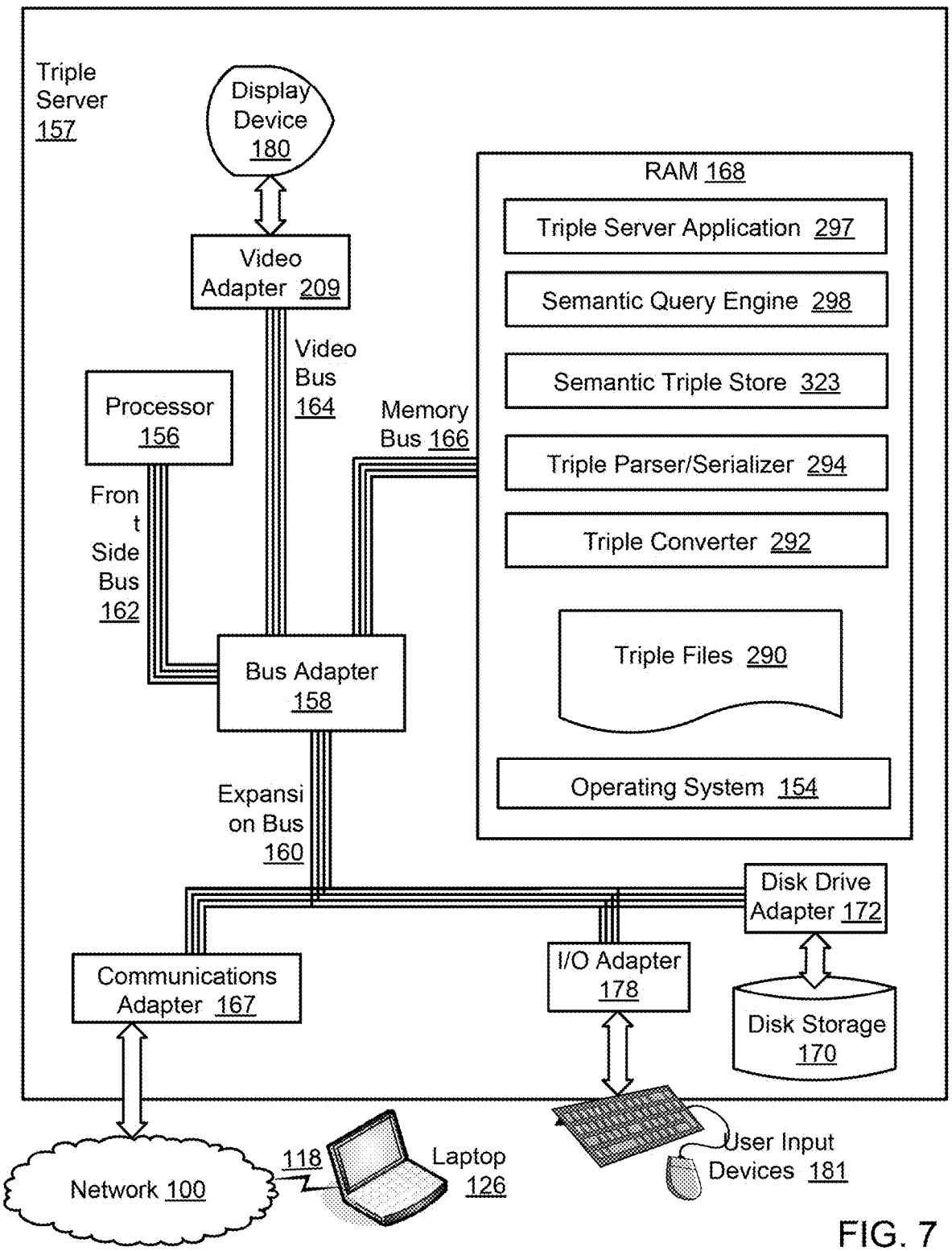
FIG. 7 sets forth a block diagram of automated computing machinery comprising an example of a computer useful as a triple server for call preparation according to embodiments of the present invention.

For further explanation, FIG. 7 sets forth a block diagram of automated computing machinery comprising an example of a computer useful as a triple server (157) for call preparation according to embodiments of the present invention. The triple server (157) of FIG. 7 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), a semantic query engine (298), a semantic triple store (814), a triple parser/serializer (294), a triple converter (292), and one or more triple files (290). The triple server application program (297) accepts, through network (100) from speech-enabled devices such as laptop (126), semantic queries that it passes to the semantic query engine (298) for execution against the triple stores (323, 325).

The triple parser/serializer (294) administers the transfer of triples between triple stores and various forms of disk storage. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores, the triple parser/serializer stores the output triple stores into contiguous segments of memory. Contiguous storage can be effected in the C programming language by a call to the malloc( ) function. Contiguous storage can be effected by the Python buffer protocol. Contiguous storage can be effected in other ways as will occur to those of skill in the art, and all such ways are within the scope of the present invention. In many embodiments, both triple stores (323, 325) would be stored in one or two segments of contiguous memory.

Figure 8:
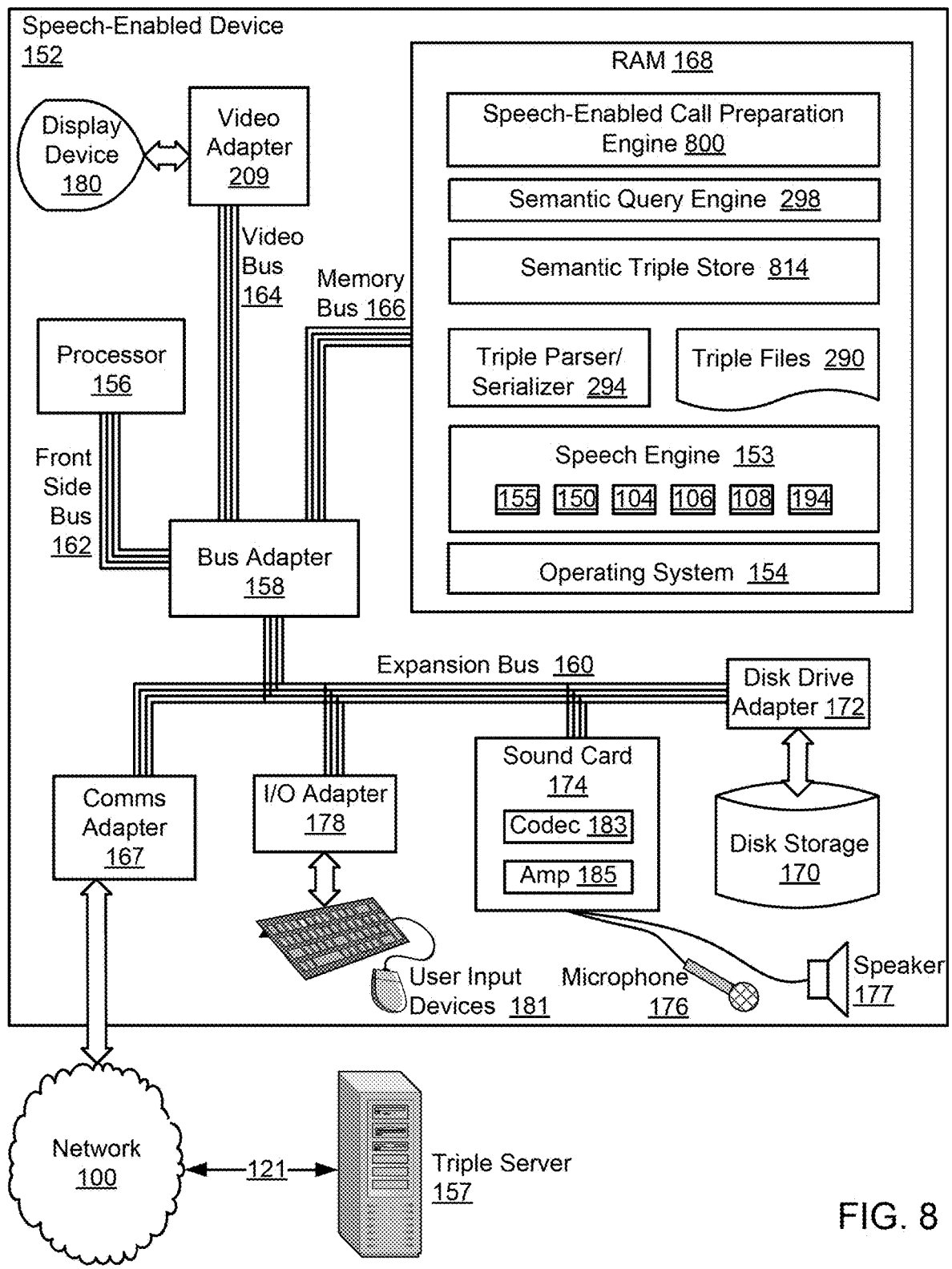
FIG. 8 sets forth a functional block diagram of an example apparatus for call preparation for CRM in computer memory in a thick-client architecture according to embodiments of the present invention.

For further explanation, FIG. 8 sets forth a functional block diagram of example apparatus for call preparation for CRM in computer memory in a thick-client architecture according to embodiments of the present invention. A thick-client architecture is a client-server architecture in which all or most of the functionality required to administer configuring computer memory with triples of a description logic is supported directly on client-side speech-enabled devices rather than on servers. Servers are used for backup and synchronization rather than speech recognition or semantic queries. A thick client requires resources, processor power and storage, possibly not always available on a small device such as a smartwatch. In a thick client with sufficient data processing resources, however, all pertinent functionality, queries, triples, speech, are typically immediately and fully useful, regardless of network availability.

The thick-client speech-enabled device in the example of FIG. 8 is automated computer machinery that includes a processor (156), RAM (168), data buses (162, 164, 166, 160), video (180, 209), data communications (167), I/O (178), and disk storage (170). Disposed in RAM are a speech-enabled call preparation engine (800), a semantic query engine (298), a semantic triple store (814), a triple parser/serializer (294), a triple converter (292), and one or more triple files (290). The speech-enabled application (195) accepts from user input semantic queries that it passes to the semantic query engine (298) for execution against the triple store (814). All pertinent triples are available in local RAM. All queries succeed or fail based on local storage alone. No queries are ever forwarded to the triple server (157). The triple server (157) provides long-term backup and synchronization functions when multiple client-side devices share the contents of triple stores, but, for any particular query, all responsive triples are available directly on the client side.

The triple parser/serializer (294) administers the transfer of triples between triple stores and disk storage (170), and disk storage is available directly on the thick client (152) rather than across a network on a server. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores, the triple parser/serializer stores the output triple stores into contiguous segments of memory.

The speech-engine engine (153) is a full-service NLP-SR engine that includes natural language processing (155), speech recognition (150), a grammar (104), a lexicon (106), a model (108), and text-to-speech processing (194), all as described in more detail above. The thick-client speech-enabled device (152) has no need to reach across a network for speech-related processing. Full speech enablement is available directly on the speech-enabled device itself.

Figure 9:
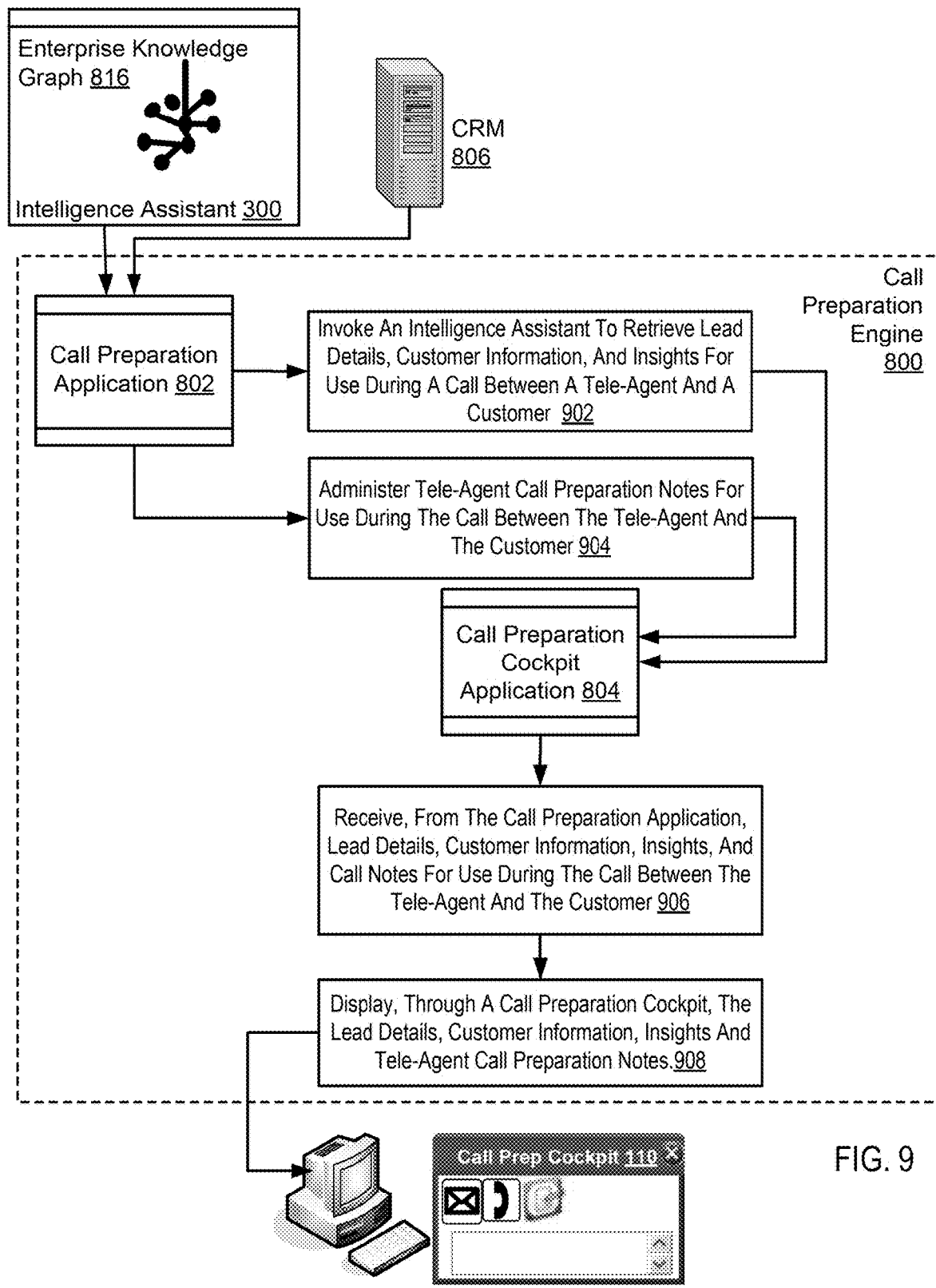
FIG. 9 sets forth a flow chart illustrating an example method for call preparation for customer relationship management ('CRM') according to embodiments of the present invention.

For further explanation, FIG. 9 sets forth a flow chart illustrating an example method for call preparation for customer relationship management ('CRM') according to embodiments of the present invention. The method of FIG. 9 includes invoking (302), by a call preparation application (802), an intelligence assistant to retrieve lead details, customer information, and insights for use during a call between a tele-agent and a customer. Invoking (302) an intelligence assistant may be carried out by establishing communications with the intelligence assistant and providing to the intelligence assistant information necessary to identify and receive lead details, customer information, and insights. Such information may include an identification of the tele-agent, campaign the tele-agent is supporting, the customer, the client, and many others as will occur to those of skill in the art.

Once invoked, the intelligence assistant may provide additional information upon its own motion, on request, periodically, or in other ways as will occur to those of skill in the art. For example, the intelligence assistant may parse text converted from speech of a tele-agent into semantic triples in dependence upon a call preparation taxonomy and a call preparation ontology and store the parsed triples in an enterprise knowledge graph of a semantic graph database. The intelligence assistant my then develop real-time queries and query the semantic database with the real-time queries and identify insights and other useful information in dependence upon the results of the real-time queries. Furthermore, the intelligence assistant may identify one or more third-party resources such as industry resources, social media resources, and the like and query the identified resources for information relevant to the call between the tele-agent and the customer.

The method of FIG. 9 includes administering (304), by the call preparation application (802), tele-agent call preparation notes for use during the call between the tele-agent and the customer. Administering (304) tele-agent call preparation notes may be carried out by retrieving previously prepared call notes, receiving call notes from the tele-agent, identifying standard or pre-prepared call note templates, or in other ways as will occur to those of skill in the art. In some embodiments, the call preparation application is configured to receive, through the call preparation cockpit application, speech for recognition from the tele-agent and invoke an automated speech recognition engine to convert the speech for recognition into text in dependence upon one or more call preparation grammars and store text as call preparation notes for use by the tele-agent.

The method of FIG. 9 includes receiving (906), by a call preparation cockpit application (804) from the call preparation application, lead details, customer information, insights, and call notes for use during the call between the tele-agent and the customer displaying (908), through a call preparation cockpit, the lead details, customer information, insights and tele-agent call preparation notes. Displaying (908), through a call preparation cockpit, the lead details, customer information, insights and tele-agent call preparation notes may be carried out by rendering an XML or other markup language page containing the lead details, customer information, insights, and call preparation notes.

In the example of FIG. 9, the call preparation application (802) may retrieve customer information from one or more customer relationship management ('CRM') systems (806). Such customer information may include use cases, sales histories, known technology used by the customer and other useful information for the tele-agent in the upcoming call;

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A call preparation engine for customer relationship management ("CRM"), the call preparation engine comprising a module of automated computing machinery stored on one or more non-transitory computer-readable mediums, the call preparation engine including:
    a call preparation application comprising a module of automated computing machinery stored on a non-transitory computer-readable medium configured to invoke an intelligence assistant to retrieve lead details, customer information, and insights for use during a call between a tele-agent and customer and administer tele-agent call preparation notes for use during the call between the tele-agent and the customer, wherein the intelligence assistant further comprises a triple parser and an insight generator, and wherein the triple parser is configured to parse text converted from speech of a tele-agent into semantic triples in dependence upon a call preparation taxonomy and a call preparation ontology and store the parsed triples in an enterprise knowledge graph of a semantic database; and the insight generator is configured to develop real-time queries and query the semantic database with the real-time queries and identify insights using results of the real-time queries; and
    a call preparation cockpit application comprising a module of automated computing machinery stored on a non-transitory computer-readable medium configured to receive, from the call preparation application, lead details, customer information, insights, and call notes for use during the call between the tele-agent and the customer and display, through a call preparation cockpit, the lead details, customer information, insights and tele-agent call preparation notes,
    wherein the call preparation application is configured to receive, through the call preparation cockpit application, speech for recognition from the tele-agent and invoke an automated speech recognition engine to convert speech for recognition into text using one or more call preparation grammars.

2. The call preparation engine of claim 1 wherein the insight generator is configured to develop real-time queries using text converted from speech between the tele-agent and the customer.

3. The call preparation engine of claim 1, wherein the insight generator is configured to develop real-time queries using customer information updated during the call between the tele-agent and the customer.

4. The call preparation engine of claim 1, wherein the intelligence assistant further comprises a third-party data retrieval module, a module of automated computing machinery stored on one or more non-transitory computer-readable mediums configured to identify one or more third-party resources and query the identified resources for information relevant to the call between the tele-agent and the customer.

5. The call preparation engine of claim 4, wherein the third-party resources includes one or more social media platforms.

6. The call preparation engine of claim 4, wherein the information relevant to the call between the tele-agent and the customer includes industry insights.

7. The call preparation engine of claim 1, wherein the call preparation application is configured to retrieve customer information from one or more customer relationship management ('CRM') systems.

8. The call preparation engine of claim 1, wherein the call preparation application is configured to receive, from the intelligence assistant or a CRM, one or more for use cases for the tele-agent in an upcoming call;
    and wherein the call preparation cockpit application is further configured to receive, from the call preparation application, the use cases and display, through a call preparation cockpit, the use cases.

9. A method for customer relationship management ("CRM") comprising:
    invoking an intelligence assistant to retrieve lead details, customer information, and insights for use during a call between a tele-agent and a customer, wherein the intelligence assistant further comprises a triple parser and an insight generator, and wherein the triple parser is configured to parse text converted from speech of a tele-agent into semantic triples in dependence upon a call preparation taxonomy and a call preparation ontology and store the parsed triples in an enterprise knowledge graph of a semantic database; and the insight generator is configured to develop real-time queries and query the semantic database with the real-time queries and identify insights using results of the real-time queries;

administering tele-agent call preparation notes for use during the call between the tele-agent and the customer; and displaying, through a call preparation cockpit, the lead details, customer information, insights and tele-agent call preparation notes, wherein the call preparation cockpit includes a module of automated computing machinery stored on a non-transitory computer-readable medium configured to receive, from a call preparation application, the lead details, customer information, insights, and call notes for use during the call between the tele-agent and the customer, wherein the call preparation application is configured to receive, through the call preparation cockpit, speech for recognition from the tele-agent and invoke an automated speech recognition engine to convert speech for recognition into text using one or more call preparation grammars.

10. The method of claim 9, further comprising developing real-time queries, querying the semantic database with the real-time queries and identifying insights using results of the real-time queries.

11. The method of claim 10, further comprising developing real-time queries using text converted from speech between the tele-agent and the customer.

12. The method of claim 10, further comprising developing real-time queries using customer information updated during the tele-agent and the customer.

13. The method of claim 9, further comprising identifying one or more third-party resources and querying the identified resources for information relevant to the call between the tele-agent and the customer.

14. A system for call preparation comprising:

a call preparation engine configured to receive and display real-time customer information to a tele-agent and real-time insights, wherein the call preparation engine comprises a module of automated computing machinery stored on a non-transitory computer-readable medium configured to invoke an intelligence assistant to retrieve lead details, customer information, and insights for use during a call between a tele-agent and a customer and administer tele-agent call preparation notes for use during the call between the tele-agent and the customer, and wherein the call preparation engine is configured to receive, through a call preparation cockpit application, speech for recognition from the tele-agent and invoke an automated speech recognition engine to convert speech for recognition into text using one or more call preparation grammars;

the intelligence assistant configured to administer real-time queries and generate real-time insights, wherein the intelligence assistant further comprises a triple parser and an insight generator, and wherein the triple parser is configured to parse text converted from speech of a tele-agent into semantic triples using a call preparation taxonomy and a call preparation ontology and store the parsed triples in an enterprise knowledge graph of a semantic database, and the insight generator is configured to develop real-time queries and query the semantic database with the real-time queries and identify insights using results of the real-time queries; and the semantic graph database configured to receive from the intelligence assistant real-time queries and return results to the intelligence assistant information to generate insights.

\* \* \* \* \*